(12) United States Patent
Yeager et al.

(10) Patent No.: US 7,591,881 B2
(45) Date of Patent: Sep. 22, 2009

(54) METHODS AND DEVICES FOR HUMIDITY CONTROL OF MATERIALS

(75) Inventors: Nicholas G. Yeager, Penngrove, CA (US); Kathleen C. Hayes, College Park, MD (US)

(73) Assignees: Artifex Equipment, Inc., Penngrove, CA (US); The United States of America as represented by the United States Department of Agriculture, Washington, DC (US)

( * ) Notice: Subject to any disclaimer, the term of this patent is extended or adjusted under 35 U.S.C. 154(b) by 172 days.

(21) Appl. No.: 11/241,746

(22) Filed: Sep. 29, 2005

(65) Prior Publication Data

US 2006/0137530 A1    Jun. 29, 2006

Related U.S. Application Data

(60) Provisional application No. 60/614,582, filed on Sep. 29, 2004.

(51) Int. Cl.
*B01D 53/14* (2006.01)

(52) U.S. Cl. .................. 95/117; 34/353; 34/DIG. 1; 206/204

(58) Field of Classification Search .......... 95/90, 95/117; 96/147, 134, 154; 34/329, 333, 34/345, 353, 416, 611, DIG. 1; 252/194
See application file for complete search history.

(56) References Cited

U.S. PATENT DOCUMENTS

| | | | |
|---|---|---|---|
| 3,935,099 A | 1/1976 | Weaver et al. | |
| 3,981,100 A | 9/1976 | Weaver et al. | |
| 3,985,616 A | 10/1976 | Weaver et al. | |
| 3,997,484 A | 12/1976 | Weaver et al. | |
| 4,159,260 A | 6/1979 | Jones et al. | |
| 4,295,987 A | 10/1981 | Parks | |
| 4,321,756 A * | 3/1982 | Mosely | 34/322 |
| 4,783,510 A | 11/1988 | Saotome | |
| 4,826,497 A * | 5/1989 | Marcus et al. | 604/359 |
| 4,915,715 A | 4/1990 | Oshima et al. | |
| 5,035,805 A * | 7/1991 | Freeman et al. | 210/689 |
| 5,130,391 A | 7/1992 | Ahmed et al. | |
| 5,196,470 A | 3/1993 | Anderson et al. | |
| 5,281,673 A | 1/1994 | Ahmed et al. | |
| 5,354,806 A | 10/1994 | Hsieh | |
| 5,443,899 A | 8/1995 | Barcus et al. | |
| 5,458,773 A * | 10/1995 | Holland | 210/282 |
| 5,720,736 A * | 2/1998 | Hatsuda et al. | 604/368 |
| 5,795,439 A | 8/1998 | Euripides et al. | |

(Continued)

OTHER PUBLICATIONS

Internet Document http://www.m2polymer.com/html/history_of_superabsorbents.html, History of Super Absorbent Polymer Chemistry, M2 Polmer Technologies, Inc., 2008.*

(Continued)

*Primary Examiner*—Frank M Lawrence
(74) *Attorney, Agent, or Firm*—Quine Intellectual Property Law Group, P.C.; Paul Littlepage

(57) ABSTRACT

This invention provides novel devices and methods for manipulation of moisture/fluid levels in and/or upon objects and is used to, e.g., safely dry wet books and documents with minimal deleterious side effects or to add humidity to such books/documents or other objects or areas.

15 Claims, 3 Drawing Sheets

U.S. PATENT DOCUMENTS

| | | | |
|---|---|---|---|
| 6,086,950 | A | 7/2000 | Masaki et al. |
| 6,354,019 | B1* | 3/2002 | Becker ...................... 34/403 |
| 6,376,034 | B1* | 4/2002 | Brander ................... 428/35.2 |
| 7,007,405 | B2* | 3/2006 | Hajek et al. .................. 34/259 |
| 7,232,300 | B2 | 6/2007 | Walter et al. |
| 2005/0144693 | A1 | 7/2005 | Hagen |
| 2005/0155491 | A1* | 7/2005 | Faust et al. ................. 96/108 |
| 2005/0187316 | A1 | 8/2005 | Nardoza et al. |
| 2006/0236868 | A1* | 10/2006 | Pansegrouw et al. .......... 96/134 |

OTHER PUBLICATIONS

"Campbell 'bowls' over moisture threat: with the use of dessicants, damage to labels or cans," *Packaging Digest*, Nov. 1, 2001, 38(11):52(1).

"Dehumidifying with dessicants (gas technology)," *Plant Engineering*, 50(3):A4(4), 1996.

"Dessicant pack allows for low-cost transport of exotic woods," *Packaging Digest*, May 1, 2001, 38(5):42.

Knapp "It sucks, but that's a good thing," *Wired News*, Website: http://www.wired.com/print/science/discoveries/news/2003/09/60614, (Sep. 30, 2003).

Reed "Moisture prevention for packaged semiconductors," *Semiconductor International*, Oct. 1, 2003, 26(11):36.

Albright (1999) "Emergency salvage of wet photographs," Technical Leaflet, Emergency Management, Section 3, Leaflet 8. Andover, MS: Northeast Document Conservation Center.

Buchanan (1999) "Emergency salvage of wet books and records," Technical Leaflet, Emergency Management, Section 3, Leaflet 7. Andover, MS: Northeast Document Conservation Center.

Hadgraft & Welch. (Mar. 1999) "Vacuum packing and its implications for conservation and preservation of library, archive and related materials," Paper Conservation News, No. 89.

Norris (1998) "Disaster Recovery: salvaging photograph collections." Philadelphia, PA: Conservation Center for Art and Historic Artifacts.

Suszkiw (Sep. 22, 2003) "Absorbent polymer has 'thirst' for knowledge," USDA website: hyyp://www.ars..usda.gov/is/pr/2003/030922.htm.

The Alchemist "Dry reading." (Oct. 2, 2003).

Verheyen "Basic paper treatments for printed book materials," Guild of Book Workers, 9$^{th}$ Anniversary Seminar on the Standards of Excellence, Portland, Oregon. (Oct. 28-29, 1989).

Walsh (May 1997) "Salvage operations for water damaged archival collections: a second glance," WAAC Newsletter, v.19(2).

Welch (1999) "Drying and Humidification using vacuum packing and anoxic enclosures," Paper Conservation News, No. 89.

Minter (2002) "Water damaged book: washing intact and air drying—a novel approach," The Book and Paper Group Annual 21, p. 105-109.

\* cited by examiner

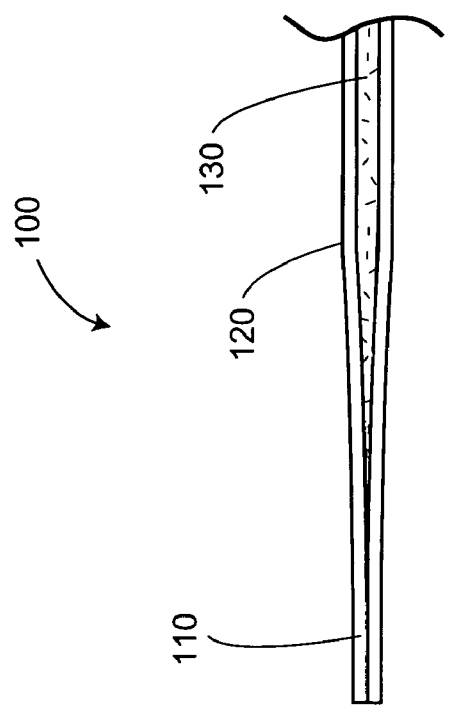
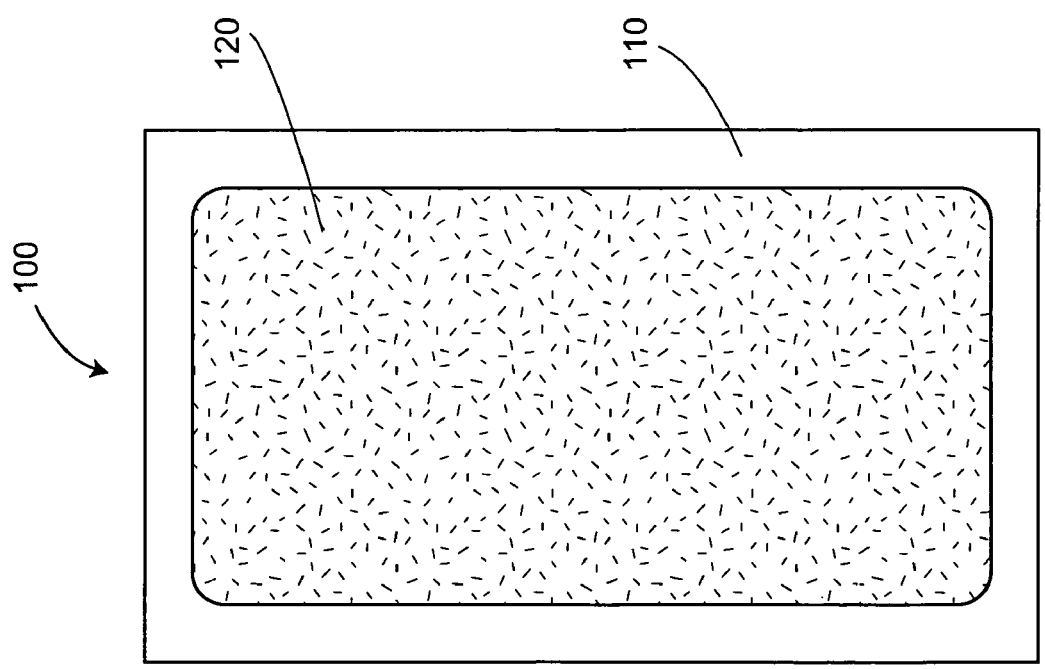

METHODS AND DEVICES FOR HUMIDITY CONTROL OF MATERIALS

CROSS-REFERENCE TO RELATED APPLICATIONS

This application claims benefit from, and priority to, Provisional Patent Application U.S. Ser. No. 60/614,582, filed Sep. 29, 2004, the disclosure of which is incorporated herein by reference in its entirety for all purposes.

FIELD OF THE INVENTION

The invention relates primarily to the field of humidity/moisture control technology. More specifically, the invention pertains to methods and devices for drying (or reducing water or moisture content of) or humidifying (or adding moisture content to) materials such as books, papers, and the like, as well as other objects.

BACKGROUND OF THE INVENTION

Water damage to books, papers, and other similar material has been a problem for as long as there have been collections of books and documents. Traditional book drying methods have tended to primarily focus either on the use of centralized, high technology equipment, or on labor-intensive manual methods (or combinations of both). Unfortunately, books and other similar material are not unlike sponges. Because paper is hydroscopic, a bound book can absorb up to 200% of its original weight in water. The addition of such large amounts of water can lead to swelling or expansion of the book/paper. The text-block of a soaked book typically expands against its binding, causing the spine of the book to become concave in shape, and forcing the text-block to become detached from the binding. In fact, the majority of water damage to bound books is caused by such swelling and typically takes place within the first four hours after exposure of the material to water. The board cores of bindings can also absorb a great amount of water and are usually the source of mold development between the board papers and fly leaves. Wet books and papers are subject to mechanical, chemical, and cosmetic damage within hours of becoming damp.

Throughout its history, the field of library preservation has responded to major disasters by creating new recovery technology. For example, in 1966, floods in Florence, Italy inundated millions of books and manuscripts. In response to the flood, the use of commercial food freeze-drying technology to remove moisture from books was pioneered to assist in handling the enormous quantity of material that was damaged.

Major disasters such as the 9/11 terrorist attacks on the United States (which caused substantial damage to the Pentagon Library, the 2002 Central European floods (which inundated about 50 Czech Republic libraries containing more than 600,000 volumes), and hurricanes such 2005's Katrina, continue to highlight the need for fast, portable, and inexpensive recovery/conservation techniques for books and paper materials. Again, such disasters have driven new technology development through renewed awareness, yet each presents novel challenges, e.g., damage to old printed books with leather bindings, unique historical drawings and architectural plans, photographs, music manuscripts, etc.

Various previous methods for drying are outlined briefly below. It will be noted that not many methods exist, despite the number and extent of disasters and the value of the materials involved. To further complicate matters, such traditional methods do not work well for all situations and there are numerous instances where the traditional methods are not feasible or appropriate.

Literature produced by the Northeast Document Conservation Center (NEDCC), Emergency Salvage of Wet Books and Records, Emergency Management, Section 3, Leaflet 7, 1999, outlines various procedures for drying materials such as books, e.g., air drying, freezer drying, cryogenic drying, vacuum freeze drying, and vacuum thermal drying. Other traditional methods for drying wet documents, include vacuum bags (containing the material to be dried) that are transferred to a freeze drying chamber, heated press devices for organic materials, heated vacuum chambers, and freezing and maintaining materials below freezing. The general literature reveals that vacuum drying and vacuum freeze-drying are typically the most common methods for drying wet materials. Other drying processes include warm air (e.g., used to dry deacidified paper), and vacuum pressure used in conjunction with high frequency radiation.

Air-drying is the oldest method for drying books and paper. It is labor and time intensive, sometimes taking days to weeks to dry a book. Since paper will give off water if exposed to air, wet books can be stood up and fanned out allowing them to lose a large quantity of moisture to the air. Fans may also be employed to assist in evaporation. In any event, however, drying can take days to occur, and there is the potential of cockling or wrinkling of the paper in the text-block. Subsequent work requires that the drying books be interleaved with blotter and restrained under pressure. The expansion of the wet books can require 20-to-30 percent more shelf space because of swelling, etc. In general, air-drying is most suitable for small numbers of damp or slightly wet books and documents.

Freeze-drying using a self-defrosting blast freezer and Forced-air drying under pressure and vacuum packing are other methods of drying books, papers, etc. However, such methods also have a number of drawbacks, e.g., expense, length of time required, etc.

In addition to drying books, papers, and other objects, it is also often desirable to humidify them, e.g., in order to relax brittle pages or to prevent shrinkage and warpage, etc.

A welcome addition to the art would be methods and devices to quickly and conveniently dry and humidify books, paper, records, film, photographs, and similar materials, as well as other objects, even in large quantities at a low cost and without the need for off-site shipment and expensive or complex equipment. The present invention provides these and other benefits that will be apparent upon examination of the following.

SUMMARY OF THE INVENTION

The present invention comprises, inter alia, methods of manipulating the moisture content of objects or areas by bringing one or more laminate construct into contact with the object or area for a defined period of time. The laminate constructs involved with such methods comprise a superabsorbent polymer (SAP) sealed within at least one layer of porous material. The objects and/or areas manipulated by such methods can comprise, e.g., paper products, books, papers, vellum sheets, parchment sheets, fiber-based objects, artwork, furniture, musical instruments, archival materials, clothing, gear, and equipment such as shoes, ski boots, electronics, perishable goods such as foodstuffs, walls, carpets, floors, chambers, vaults, storage containers and cargo holds, areas for dehydration and freeze-drying of food, feed and grain processing areas, leather, lumber, biological specimens and their collection and preservation areas, computer chips, firearms, delicate instruments, and other materials susceptible to moisture such as wood, tapestries, rugs, textiles, baskets, and items composed of animal, plant and/or cellulose materials. The laminates in such methods can comprise a sheet of laminate or a bag constructed from laminate. In some embodiments, the object comprises a paper product, a book, paper, vellum, parchment, or a fiber-based object and the laminate comprises a sheet that is intercalated between pages of the book, or between pieces of the paper, vellum, parchment, or fiber-based object. Also in such methods the layer of SAP can comprise one or more of (or any combination of) a water-soluble adhesive, methylcellulose, starch, wheatstarch, or cornstarch, and powdered, granulated, or particulated SAP. In typical embodiments, such methods do not utilize laminate constructs that have SAP layers comprising additional mechanical structural elements such as fluffy cellulose fibers or the like within the SAP layer. Additionally, in certain embodiments, the SAP layers utilized in such methods do not substantially impregnate or penetrate into the layers of porous material; rather, the SAP layer can optionally adhere to the surface of the porous layer. The SAP utilized in various embodiments of such methods can comprise one or more of (or any combination of) Super Slurper, a polyacrylamide, a polyacrylamide derivative, a polyacrylonitrile, a polyacrylonitrile derivative, a starch, a starch based SAP, and an alkali saponified gelatinized-starch-polyacrylonitrile graft polymer. Super Slurper can comprise a superabsorbent polymer comprising a water-insoluble alkali salt of aqueous alkali saponified gelatinized-starch-polyacrylonitrile graft polymers which contain gelatinized starch (GS) and saponified polyacrylonitrile (HPAN) in molar ratios of from about 1:1.5 to 1:9 GS:HPAN. The porous material present in such methods can comprise one or more of paper, filter paper, nylon membrane, cloth, felt, or nonwoven membrane such as polypropylene. In various embodiments, the methods of manipulating the moisture content of an object/area involve having the laminate construct actually touch the object, while in other embodiments, the laminate structure does not directly contact the object, but is near the object or in the area of the object. The moisture content in such methods can be either decreased or increased. In the embodiments wherein the moisture content is increased, the SAP typically comprises, or can be saturated with, a fluid (e.g., at least a partially aqueous fluid) that is at least partially capable of evaporation out of the laminate construct.

In other aspects, the invention comprises devices (e.g., a sheet of laminate or a bag constructed from sheets of laminate) for manipulating the moisture content of objects or areas. In various embodiments, such devices comprise a laminate construct having at least one layer of SAP sealed within at least one layer of porous material. The SAP layer in such devices can comprise one or more of (and any combination of): a water-soluble adhesive, methylcellulose, starch, wheatstarch, or cornstarch and powdered, granulated, or particulated SAP. Typically such devices do not have SAP layers comprising additional mechanical structural elements such as fluffy cellulose fibers or the like within the SAP layer. Additionally, the SAP layer in such devices optionally does not substantially impregnate or penetrate into the layer of porous material, rather, the SAP layer can optionally adhere to the surface of the porous material. Furthermore, the SAP can be one or more of (or any combination of): Super Slurper, a polyacrylamide, a polyacrylamide derivative, a polyacryloni- trile, a polyacrylonitrile derivative, a starch, a starch based SAP, and an alkali saponified gelatinized-starch-polyacrylonitrile graft polymer. The Super Slurper in such devices can comprise a superabsorbent polymer comprising a water-insoluble alkali salt of aqueous alkali saponified gelatinized-starch-polyacrylonitrile graft polymers which contain gelatinized starch (GS) and saponified polyacrylonitrile (HPAN) in molar ratios of from about 1:1.5 to 1:9 GS:HPAN. In various embodiments, the porous material in such devices can comprise one or more of: paper, filter paper, nylon membrane, cloth, felt, or nonwoven membrane such as polypropylene.

In other aspects, the invention comprises methods for producing a device for manipulating moisture content of an object or area, by sealing at least one layer of SAP within at least one layer of porous material. In such methods, the SAP can be adhered to the porous material by, e.g., one or more water-soluble adhesive, by methylcellulose, by starch, by wheatstarch, by cornstarch, or by adherence between the SAP layer and the layer of porous material without adhesive. Here too, the SAP in such aspects can be one or more of (or any combination of): Super Slurper, a polyacrylamide, a polyacrylamide derivative, a polyacrylonitrile, a polyacrylonitrile derivative, a starch, a starch based SAP, and an alkali saponified gelatinized-starch-polyacrylonitrile graft polymer. The Super Slurper can comprise a superabsorbent polymer comprising a water-insoluble alkali salt of aqueous alkali saponified gelatinized-starch-polyacrylonitrile graft polymers which contain gelatinized starch (GS) and saponified polyacrylonitrile (HPAN) in molar ratios of from about 1:1.5 to 1:9 GS:HPAN, while the porous material can comprise one or more of: paper, filter paper, nylon membrane, cloth, felt, or nonwoven membrane such as polypropylene. The invention also includes devices produced by such methods.

In yet other aspects, the invention comprises systems for manipulating the moisture content of objects and/or areas. Such systems can comprise any of the devices herein for manipulating the moisture content (either increasing and/or decreasing) of an object and/or area (and being comprised of an SAP layer sealed within a layer of porous material) and the one or more object or area to be manipulated.

These and other objects and features of the invention will become more fully apparent when the following detailed description is read in conjunction with the accompanying figures.

DEFINITIONS

Before describing the invention in detail, it is to be understood that this invention is not limited to particular configurations, which can, of course, vary (e.g., different combinations of SAPs and fiber materials, etc.). It is also to be understood that the terminology used herein is for the purpose of describing particular embodiments only, and is not intended to be limiting. As used in this specification and the appended claims, the singular forms "a," "an," and "the" include plural referents unless the context clearly dictates otherwise. Thus, for example, reference to "a book" includes a combination of two or more books, and the like.

As used herein "SAP" or "super absorbent polymer" should be understood to refer to any known or subsequently discovered polymer or group of polymers that absorb many times their own dry weight (e.g., 10 times, 30 times, 50 times, 100 times, or 500 times or more) in fluid (e.g., typically water) and are capable of retaining such fluid even under pressure. As used herein, an SAP can comprise one or more of any of a number of compounds and substances as long as it exhibits the desired absorbency, can be presented in proper form to be utilized with the laminate devices herein (e.g., in powdered or particulate form of a size such that it does not substantially leak or escape from the laminate devices) and does not react adversely to other components of the methods and devices herein.

A number of SAPs are currently commercially available including, for example, crosslinked polyacrylic acids and crosslinked starch-acrylic acid graft polymers, in which some of the carboxyl groups are neutralized with sodium hydroxide solution or potassium hydroxide solution. Additionally, other SAPs can include, polysaccharides such as, cellulose, starch, and regenerated cellulose that are modified to be carboxylated, phosphonoalkylated, sulphoxylated or phosphorylated. SAPs can also include water swellable polymers of water-soluble acrylic or vinyl monomers crosslinked with a polyfunctional reactant.

Other examples of polymers amenable for use as SAPs in the present invention include, but are not limited to: polyethylene oxide, polyvinyl pyrrolidone, polyacrylamides, polyvinyl alcohol, ethylene maleic anhydride copolymers, polyvinyl ethers, hydroxypropyl cellulose, methyl cellulose, carboxymethyl cellulose, polyvinyl alcohol-acrylate copolymers, polyvinly morpholinone, polymers and copolymers of vinyl sulfonic acid, polyacrylic acid base compolymers, hydrolysis of starch acrylonitrile graft copolymers, starch-acryl acid graft copolymers, polyacrylates, polyacrylamides, polyvinyl pyridine, dextran, agar, gelatine, propylene glycol alginate, sodium alginate, polyethylene imine, and the like.

Commercially available SAPs capable of use with the invention include, e.g., Agsorbent (or Super Hydro Grow), also known as "Super Slurper" (Superabsorbent Company, Irvine, Calif.); Chem Star Superabsorbent, additionally also known as "Super Slurper" (Chem Star, Minneapolis, Minn.), Waterlock (Grain Processing Corp., Muscatine, Iowa), Sanwet (BASF, Portsmouth, Va.), Drytech 520 (Dow Chemical Company, Midland Mich.), Aqua Keep (Seitetsu Kagaku Co., Hyogo, Japan), Arasorb (Arakawa Chemical Industries, Osaka, Japan), Favor (Stockhausen Inc., Greensboro, N.C.), and SA55SX (Sumitomo Chemical Co., Osaka, Japan). Those of skill in the art will be familiar with a number of other SAPs that could be used in the present invention.

An especially preferred SAP for use in the invention comprises "Super Slurper" and/or derivatives thereof (e.g., comprising polymethacrylonitrile rather than polyacrylonitrile). Super Slurper comprises a water-insoluble alkali salt of aqueous alkali saponified gelatinized-starch-polyacrylonitrile (or polymethacrylonitrile) graft polymers which contain gelatinized starch (GS) and saponified polyacrylonitrile (HPAN) (or polymethacrylonitrile) in molar ratios of from about 1:1.5 to 1:9 GS:HPAN as described in U.S. Pat. Nos. 3,935,099, 3,985,616, 3,981,100, 4,116,899 , and 3,997,484. After wetting, Super Slurper can be reused by drying out the polymer through evaporation, etc.

The SAPs herein can also comprise mixtures of SAP(s) and other substances, e.g., starch, cornstarch, fungicides, bactericides, adhesives, deodorizers, cleansing agents, polymers to aid in structural integrity of the SAP layer, etc. in various percentages. Particular embodiments, however, do not comprise structural mechanical additives such as fluffy cellulose fibers, etc.

The terms "laminate," "laminate structure," "laminate device," "laminate construct," or "envelope" and the like, refer to the laminated construction of the various SAP devices herein. As shown in FIG. 1, SAP and/or SAP mixtures are laminated between at least two layers of material, e.g., one layer membrane on "top" of the SAP layer and one layer membrane on "bottom" of the SAP layer. Such membrane layers can comprise, e.g., paper, fine weave cloth, felt, non-woven materials such as polypropylene, etc. The layers of material are then sealed typically only around the edges of the construct (e.g., through use of adhesives, through adhesion between the material layers without added adhesives, through sewing, through heat sealing, etc). The layers of material are also optionally sealed to created chambers or pockets in a quilting effect between the membrane layers. The layers of material encasing the SAP can be of porous and/or hydrophilic composition (e.g., paper, filter paper, woven material such as nylon membrane, etc.). In various descriptions herein, such layers are also described as membranes. The terms "laminates," "envelopes," and similar descriptors are used interchangeably throughout, depending upon context. The SAP laminate devices can be of myriad shapes in various embodiments, e.g., single sheets, bags formed from the laminated sheets, accordion folded configurations such as tubes, stacks of multiple laminates, etc.

BRIEF DESCRIPTION OF THE FIGURES

FIG. 1 shows an exemplary embodiment of an SAP envelope device of the invention. FIG. 1A shows a top view of the exemplary device, while FIG. 1B shows a cut-away side view of the same.

DETAILED DESCRIPTION

Figure 2A:
FIG. 2, Panels A and B, shows before and after depictions of a dog-eared manuscript corrected through use of the invention.

Disaster recovery is a multi-million dollar industry worldwide. Flooding, plumbing leaks, fire suppression and other occurrences can cause water damage to books, papers, artwork, and similar materials. Water causes books to expand, paper to wrinkle, and mold to grow within 48 hours on books and paper. As explained above, air-drying, vacuum pack, vacuum freeze-drying and cryogenic drying are examples of types of methods used to dry books and similar material. However, such methods often involve delayed recovery and undesirable collateral damage and can be very labor intensive.

The current invention describes methods and devices for using a super absorbent polymer (SAP), e.g., "Super Slurper," a cornstarch polymer, polyacrylamide and/or various polyacrylamide derivatives etc., and mixtures thereof, to dry wet books, papers, and other materials. The polymer absorbs the fluid without coming into direct contact with the paper or book, since the SAP is totally laminated or encased between layer(s) of porous and/or hydrophilic material (e.g., paper, or the like). However, in other embodiments, the invention comprises methods and devices for using an SAP, e.g., Super Slurper, etc. to humidify books, papers and similar materials. Additionally, it will be appreciated that the methods and devices herein can be applied for drying/humidifying other objects in addition to, or alternative to, books/papers (e.g., used to control moisture content in foodstuffs in commercial storage, agricultural products, etc.). See below.

The benefits of the current invention's gel-creating, fiber-wrapped desiccant/humicant delivery system include, e.g., portability. This allows a shift towards onsite recovery or use and allows for closer inspection and control of the results. Also, the ease of use of the invention allows it to be used by a variety of practitioners with positive results. Furthermore, the invention has a quicker recovery time—minutes instead of days per book—than many previous drying procedures. The present invention has the potential for resulting in cleaner books with little or no residual damage or staining. Since the polymers used are typically inexpensive and delivery methods are cost effective there is typically a low cost per use. The invention can also optionally be used in conjunction with freezing and later drying as a means of expanding recovery solutions. Thus, various embodiments herein comprise drying of wet books and similar materials (optionally in conjunction with and/or in addition to other traditional drying technologies such as freeze-drying). Other embodiments comprise drying of materials after such materials undergo whole-immersion for cleaning and/or deacidification and buffering and use of the invention as a humidicant. Again, the methods and devices herein are also optionally used to dry/humidify other objects besides books, papers, and the like.

In certain embodiments, the invention comprises methods using devices comprising a laminate structure (e.g., an envelope or laminate sheath) that encloses an amount of SAP. The invention uses such to remove and/or add moisture from materials, especially books, papers, and the like. FIG. 1 shows an exemplary embodiment of the invention. As can be seen in FIG. 1A, laminated construct 100, containing the SAP, can comprise a rectangular sheet shaped to match the shape of the book or paper or other object to be dried or humidified. Area 120 displays an area within the laminate structure that contains the SAP layer, while 110 shows areas of adhesion between the membranes (where no SAP layer is present between the membranes). Of course, it will be appreciated that different embodiments can comprise a myriad of different shapes to match various shapes to be dried/humidified, etc. FIG. 1B, shows a cut-away side view of the exemplary device of FIG. 1A. As can be seen, laminate layers or membranes 110 and 120 (e.g., comprising paper or the like), completely enclose SAP 130, by meeting at point 110 (which in typical embodiments traverses all edges of the laminate construct to form an envelope enclosing the SAP between the membrane layers). Again, it will be appreciated that certain embodiments can comprise different thicknesses of membrane layers and/or SAP layer depending upon, e.g., the type of liquid to be removed/added, the amount of liquid to be removed/added, the type and/or condition of the paper/book or other object to the dried or humidified, etc.

Laminate Membranes

Various embodiments of the invention can optionally comprise different materials for the "packaging" of the SAP, i.e., for construction of the membrane or sheath that contains and holds the SAP. Material(s) chosen for the laminate layers are typically porous and/or hydrophilic to allow movement of fluid into the SAP gel area. For example, commercially available filter papers are optionally used such as those available from Whatman, Inc. (Florham Park, N.J.), Great Lakes Filter (Hillsdale, Mich.), etc. Such papers can be cellulose-based and/or synthetic polymer based. Other materials can include, but are not limited to cloth, nylon membranes, nonwoven material (e.g., polypropylene), felt, woven material, etc. The laminate membranes can comprise one, or more than one, type of material in the composition of the laminate structures. For example, both the "top" and "bottom" layers can comprise the same material, e.g., the same paper type, or the layers can comprise different materials. Such multiple compositions could be of use, e.g., when the material to be dried has different components. For example, a laminate having different material compositions on each side could be placed within a wet book that has different types of paper/ink that would face the different sides of the laminate. Such multiple compositions could also be of use, e.g., when humidity control requires a one-way action, as in an environmental control used to lower relative humidity in a container. In such instances, one layer can allow for absorption from the container while not releasing moisture back into the container, while the other layer can allow for evaporation or removal of the moisture (i.e., out of the container). Cost, reusability, good wicking properties, pore size (e.g., small enough to prevent leakage of SAP out of the laminate and to prevent SAP migration into the pores thus blocking moisture movement into the laminate), and wet strength can also influence the selection of materials for the envelope. For example, a laminate membrane can comprise, e.g., a cellulose filter paper having a pore size of, e.g., 24 microns, which would be much smaller than the particulate/powder grain size of the SAP used with it. Accepted conservation standards are also used in choice of such material, e.g., whether the material is acid free, environmentally friendly, safe for handling, etc. Different packaging materials for the laminate structure can also be chosen depending on the specific encapsulation of the SAP, how the SAP is sealed within/between, affixed or embedded, etc.

Also, in certain embodiments, additional material is added to the envelope/laminate device on the outside of the membranes (i.e., on the exterior of the laminate device) to induce the passage of moisture into or out of the core area (e.g., fluffy cellulose, etc.). Other materials can optionally be part of the material used for the laminate membranes, e.g., anti-fungal compounds (such as thymol, sodium fluoride, sodium benzoate, Septabic (ABIC, Beit Shemesh, Israel), etc.), antibacterial compounds, deodorizers, compounds to inhibit ink smearing, etc.

As mentioned above, the size/shape of the SAP delivery system can vary according to book format and area that needs to be dried/humidified or of any other various objects to be dried/humidified. Thus, laminate devices can comprise substantially any desired shape to fit various books, clothing/shoes or other apparel, floors, walls, agricultural storage container/areas, paper sizes, etc. In some embodiments, multiple devices can be used to dry or humidify at the same time (see below). Thus, for example, if a book to be dried has a page size of 6×9 inches, then two sheets of 6×4.5 inches could be used, etc. Additionally, the devices of the methods herein can comprise three dimensional shapes to fit three dimensional objects to be dried or humidified, e.g., globes, artwork, packaging or storage areas for foodstuffs, etc.

Superabsorbent Polymers

Early experiments by the inventors with a cornstarch based polymer (Super Slurper) revealed that it absorbed 65 to 100 times its weight in water when configured as a sheet laminate and used as a book desiccant. While much less than its expected ability to absorb 2000 times its weight in moisture, the product proved effective and affordable. Such early results lead the inventors to develop the current methods and devices herein. Of course, it will be appreciated that various embodiments of the invention can optionally comprise synthetic SAP depending upon the desired use and conditions of the drying/humidifying involved.

In certain preferred embodiments, the invention comprises methods and devices having SAP laminated into an envelope, wherein the SAP comprises "Super Slurper," or a water-insoluble alkali salt of aqueous alkali saponified gelatinized-starch-polyacrylonitrile (or polymethacrylonitrile) graft polymers which contain gelatinized starch (GS) and saponified polyacrylonitrile (HPAN) (or polymethacrylonitrile) in molar ratios of from about 1:1.5 to 1:9 GS:HPAN as described in U.S. Pat. No. 3,935,099 and related patents. In other embodiments, the SAP comprises other equivalent superabsorbent polymers, as the core ingredient. See above for examples.

Super Slurper, invented by USDA's Agricultural Research Service (ARS) in the 1970s, is a cornstarch based polymer that absorbs 2000 times its own weight in water. See U.S. Pat. Nos. 3,935,099, 3,985,616, 3,981,100, and 3,997,484. Various preferred embodiments herein utilize Super Slurper as the polymer compound desiccant. As a brown granular product manufactured primarily for agricultural use, it absorbs 2000 times its weight in moisture and turns into a gel that holds moisture under pressure. Those of skill in the art will be familiar with Super Slurper (as well as a number of related desiccants) used in batteries, fuel filters, baby powders, wound dressings, soil conditioners, and seed coatings. Those of skill in the art will also be familiar with a number of such SAP compounds that can optionally be utilized as desiccants in various embodiments of the current invention.

In various embodiments, the current invention comprises a super absorbent polymer (SAP), e.g., a starch polyacrylonitrile super absorbent polymer (optionally Super Slurper) enclosed (e.g., by physical means) between two substrates (e.g., paper-like hydrophilic substrates) in a laminate that is used to control moisture. In various embodiments, the SAP can optionally comprise a polyacrylamide (or a derivative thereof), a polyacrylonitrile (or a derivative thereof), an/or a starch based SAP such as Super Slurper. See, also, Kirk & Othmer, Encyclopedia of Chemical Technology, for additional polyacrylamide and polyacrylonitrile derivatives capable of use in various embodiments herein.

The amount of SAP encased within the envelope devices used herein can vary based on a number of factors, such as the size of the envelope/laminate, the number of times the laminate device is to be used, the type of SAP utilized, the liquid to be absorbed, how dirty or salty the liquid is, etc. Additionally, the form of the SAP when placed within the laminate structures is optionally as a fine powder, granule, or particulate. The form of the SAP (e.g., granular size, etc.) is preferably of such size so that the SAP does not leak or escape through pores in the laminate membranes or clog such pores. Additionally, it is usually not desirable to have SAP particulates that are large enough to leave indentations in the materials being dried (especially if done under pressure).

Various super absorbent polymers, such as Super Slurper, which are optionally used in embodiments herein, are commercially available at approximately $3.00/lb. Because such SAPs, e.g., Super Slurper, can absorb hundreds of times their weight in water, only small amounts per usage are optionally required, in various embodiments, to desiccate or humidify a wet book or other object or area In particular embodiments, the SAP layer laminated between the outer membranes does not comprise structural mechanical additives such as fluffy cellulose, etc. However, in particular embodiments, the SAP layer within the laminate comprises a mixture of different SAPs (e.g., Super Slurper in combination with various polyacrylamides, etc.) which can optionally aid in structural integrity of the SAP layer. Additionally, the SAP layer can also optionally comprise "additives" such as, but not limited to, fungicides, bactericides, adhesives (preferably water-soluble adhesives), deodorizers, cleansing agents, etc. in various percentages (e.g., 10% additive and 90% SAP (or 90% combination of various SAPs). In certain embodiments, the SAP layers herein are mixed with one or more water-soluble adhesive such as starch, methylcellulose (or derivatives thereof), or other similar adhesives. The amount of SAP to additive, e.g., water-soluble adhesive, can be from 1% or less SAP and 99% or more additive, from 5% or less SAP and 95% or more additive, from 10% or less SAP and 90% or more additive, from 25% or less SAP and 75% or more additive, from 50% or less SAP and 50% or more additive, from 75% or less SAP and 25% or more additive, from 90% or less SAP and 10% or more additive, from 95% or less SAP and 5% or more additive, or from 99% or less SAP and 1% or more additive (or any other possible percentage combination).

In various embodiments, the SAPs used herein absorb and release fluids, liquids, and moisture vapor that are water based, e.g., water, aqueous solutions, etc, or are at least partially water based.

Laminate Construction

In embodiments of the current invention, the SAP laminate devices comprise laminate layers (e.g., layers of a wet-strength cellulose filter paper) enclosing a layer of SAP (e.g., Super Slurper). Typically, the SAP comprises a layer separate from that of the laminate membranes. Thus, in various embodiments, the laminate membranes are not substantially impregnated or contaminated with the SAP. Experiments of the inventors have shown that powdered SAP can be distributed on the surfaces of the laminate layers and adhered or fixed to them. The laminate layers are safe for use as long as the SAP is essentially sealed within the laminated sheet structure. In yet other embodiments, different shapes besides rectangular sheets are also possible. In typically embodiments, however, no matter the shape, essentially no SAP passes through the fibers of the laminate since the material comprising the layers is chosen to have pore sizes too small to allow particles of SAP to pass through. In various embodiments, the laminate structures have a thin cross-sectional profile. Thus, the depth of the SAP layer is such that is allows quick entry of fluid into the laminate device and quick exit out of vapor.

In order to fix the particulate or powdered SAP on the surface of the laminate layer, various means of trapping the powder in place can be used. Ultrasonic welding of the laminate surfaces, or trapping the SAP in quilted packets can produce varied distribution of desiccant throughout the sheet (which is optionally desirable depending upon the specific intended uses). In general, in most embodiments, the SAP within the laminate structures does not move to a great degree while it is dry or unsaturated (i.e., the powdered SAP in most embodiments tends not shift to one side of the laminate device only, etc.). However, in certain embodiments, the SAP is not loaded so tightly into the laminate structure that there is no room for expansion of the SAP due to water absorption. While use of an adhesive such as polyvinylacetate or silicone, was found to clog the SAP with adhesive and reduce absorption when mixed with the SAP, such adhesives can be used to seal the edges of the laminate sheets to trap the SAP inside. Certain embodiments, can, comprise one or more water-soluble adhesive (e.g., starch paste, methyl cellulose, etc.) to lightly affix the SAP to a substrate and/or to add structural integrity to the SAP layer.

Because starch has adhesive qualities when wetted, a slurry of corn-starch SAP, such as Super Slurper, is applied to the surface of the laminate layer (e.g., filter paper), then additional SAP powder (either Super Slurper or another SAP or mixtures thereof) optionally can be applied onto this adhesive layer, followed by the opposing laminate layer membrane. After sealing, the sheets are typically dried using airflow to evaporate excess moisture from the SAP. Thus, in construction of certain embodiments herein, a slurry of SAP and water optionally is used as a paste and applied to the surface of one layer of laminate device material that is to be adhered to its opposing layer. Additional SAP powder can then optionally be spread evenly over the surface of the slurry. The two envelope layers optionally are attached by adding pressure to secure the adhesion of paste to the substrate. In other embodiments, the slurry of SAP is deposited on each envelope layer prior to their attachment to one another. In yet other embodiments, a slurry is deposited on one or both membranes of the laminate device without addition of additional dry SAP on top of the slurry(ies). Crimping of the edges of the envelope can be used to create a barrier at the laminate perimeter and aid in retention of the SAP. The edges can optionally be sealed together with adhesives (which in certain embodiments are only present along the edges of the envelopes in order to seal them). Exemplary adhesives can include both water-soluble and water-insoluble adhesives such as starch paste. For other embodiments, the envelope layers can be tightly sewn together or the like. In some embodiments, a slurry of SAP can be mixed with a water-soluble adhesive (e.g., methylcellulose, starch paste, etc.) and deposited upon the laminate membranes (either with additional non-slurry SAP deposited on top of the adhesive-SAP slurry or not).

In some embodiments, a water soluble paste (e.g. starch paste, methyl cellulose or other such water-soluble paste adhesive) can be used to affix the SAP to the surface of the laminate layer similar to as described above. By applying the paste to the laminate and blowing, sifting, or otherwise depositing the SAP onto this wet adhesive, the SAP is trapped to the surface of the laminate. When the laminate structure is completed, the SAP is substantially evenly distributed within the laminate structure providing for an even absorption across the two dimensions of the laminate sheet product. Because this thin layer of SAP is trapped in a hydrophilic structure, the product pulls moisture (or releases it) over the whole surface area. The thinness of the laminate, its absence of barriers to the SAP and its high absorbency, is thought to cause the laminate structure to be able to absorb and release moisture more easily. The present invention simplifies the laminate process to activate the SAP unobstructed. Typical embodiments of the invention do not use filler, traps or structural wicking additives such as fluffy cellulose to aid in absorption/release of moisture.

No matter the manner of sealing the laminated devices, the envelope acts to keep the SAP away from the outer environment, e.g., the paper or book to be dried, and keeps the SAP gel, and subsequent absorbed liquid away from the outer environment, e.g., paper or book. The envelope devices create a delivery system for SAP that can absorb water in, or on, three-dimensional objects while protecting the objects from the gelatinous material created when the moisture is absorbed into the SAP. Of course, the devices also create a delivery system for SAP that can exude or emit fluid vapor (typically water vapor) into, or on, or around, three-dimensional objects, while protecting the objects form the gelatinous material within the laminate device and while protecting the objects from direct contact with fluid.

The SAP delivery system can be in sheet form as described above, and/or in accordion folds, bags, or other forms such as tubes, pouches, etc. Each configuration can be specifically designed to control moisture and can be tailored, e.g., in shape and/or size, to the material that is to be dried/humidified. Through close contact with the object or area, moisture can be removed (or even added, see below) as needed with little external intervention. For example, an accordion shaped tube (e.g., an expandable accordion tube) is one possible embodiment herein. Such shape can be useful for, e.g., removing moisture from objects such as footwear or the like. Folds of the accordion shape can touch or come into near contact with the interior of the moist footwear and absorb the moisture.

The physical lamination of SAP between laminate layers creates a membrane system that allows expansion of the SAP powder into a gel within the enclosed area. This gel will hold moisture under pressure without leaking, yet will give up moisture through evaporation. In embodiments comprising sheets or the like, large surface areas of the sheets, or surface area ratios in relation to the SAP layer, can aid in prevention of "gel blocking" wherein dry-centered boluses of material are created by too thick a layer of SAP for the liquid involved. Again, in various embodiments, the cross-sectional profile of the laminate devices is such that the SAP layer can readily take up fluid or moisture vapor and easily give off moisture vapor (e.g., depending upon the saturation of the SAP and the water/vapor concentration of the surrounding area). Such give and take is in opposition to many SAP drying devices, the goal of which is typically to absorb fluids and never release liquid or vapor.

In various embodiments, the quantity of SAP in a given laminate device can vary. Thus, the amount of SAP in various devices herein should not necessarily be taken as limiting. Several embodiments can comprise 6 by 9 inch sheets since such size corresponds to the most popular size for books. Such sheets can comprise a tenth of an ounce of SAP applied to the surface of the sheets. Such configuration becomes saturated at five ounces of water or fifty times weight in water absorbed by the sheet. In different embodiments, the sizes for the laminated sheets can optionally range from 2 by 4 inches, e.g., for poultice material to, e.g., 12 by 18 inches for large format books, etc. For even larger sizes, multiple small laminate sheets can be laid side-by-side, etc. Larger size formats are also possible, e.g., 2 feet by 2 feet, rolls of laminate (e.g., 48 inches across or greater). Accordion fold conformations are also possible (e.g., forming collapsible tubes and the like) as are multiple laminate layers stacked upon one another in pancake fashion.

While the laminate devices herein typically remove water from books, etc. at such a rapid rate, in less than a day typically, that essentially no mold growth occurs, in certain embodiments, additional compounds and chemicals are optionally added to the SAP layer (and/or to the laminate membrane, see above). For example, various fungicides are optionally added to the SAP layer to help in prevention of mold growth in, or on, the object being dried/humidified. Examples of such include, but are not limited to, thymol, sodium fluoride, sodium benzoate, Septabic (ABIC, Beit Shemesh, Israel), etc). Additionally, dispersants, deodorizers, dirt absorbers, etc., can also be added to the SAP layer and/or the envelope layers. Those of skill in the art will be familiar with similar fungicides, dirt absorbers, and the like used in book conservation and other areas, and which can be used with the current invention.

Exemplary Uses

In various embodiments, the laminated SAP devices, whatever their shape or conformation, are typically brought into direct contact with the material to be dried/humidified. Additionally or alternatively, the SAP devices can be brought into close proximity to the objects to be dried/humidified. The second usage can be done in situations wherein the object is too fragile or delicate to touch directly or, in the case of books or stacks of papers, cannot be opened or separated while wet. In either scenario the SAP envelopes/laminates and the object can optionally be isolated within a container, bag, or the like which can be sealed to aid in moisture removal or addition. Alternatively, the container/bag itself can be composed of the laminated constructs herein. In some embodiments, when decreasing the moisture content of an object or area, the SAP of the methods and devices herein, is optionally dry or substantially, but not necessarily completely, without moisture before it is used to dry the object/area. Of course, in other embodiments herein, for the SAP of the methods and devices to decrease the moisture of an object/area, the SAP is not totally dry or substantially without moisture (e.g., the SAP comprises some moisture, but is not completely saturated). In various embodiments herein, when increasing the moisture content of an object/area, the SAP is optionally saturated with a liquid, or has at least some level of moisture greater than being substantially dry (optionally before it is brought into contact with, or proximity to, the object/area to be moistened).

As will be appreciated, the SAP laminates can optionally be placed over an entire area to be dried/humidified (e.g., over the entire surface of a paper or page) or can be placed over only a part of a paper or page or other object or area. Additionally, different embodiments of devices can be used in the drying of (or addition of humidity to) an object. For example, differently shaped laminates can be used to intercalate, or interleave, between pages in a book and to wrap around the binding, spine, or cover of the book. The different constructs can also comprise differing amounts of SAP, e.g., if the cover holds more moisture than the pages within the book, etc. Furthermore, the types of material used to construct the SAP laminate and the composition of the material in the SAP layer can vary from embodiment to embodiment not only when used for different objects but also when used for the same object. Thus, for example, delicate illustrated pages of a book can require the SAP laminate membranes to be of especially nonabrasive material, etc.

In one common usage scenario, thin SAP laminates are intercalated between pages of a wet book to be dried. Multiple SAP laminates can be used to dry the same book, e.g., an SAP envelope every 10 pages, etc. As illustrated in the examples below, the greater the number of SAP envelopes used per book (and thus the fewer wet pages per SAP laminate) the faster the drying time of the book. Because the SAP expands as it draws water into itself, the wet laminates often tend to push the pages apart. For extremely wet matter and/or with use of many constructs, care is taken to ensure that such expansion does not cause the spine of the book to crack or other structural damage to occur. Other steps to aid in preventing such damage from drying include use of thin SAP constructs, which because of the thin layer of SAP, cannot expand too far and/or replacement of the SAP laminates with fresh laminates before they draw in enough moisture to expand far enough to damage the book.

In general, the desiccant or humicant ability or capacity of the invention, is directly affected by proximity. Thus, the closer the SAP is to the material to be dried/humidified, the quicker moisture will be absorbed or humidity added. Thus, in embodiments wherein SAP laminate sheets are intercalated between pages of a book to dry, the greater number of sheets that are used, the closer moisture is to a sheet and, thus, the quicker such moisture will be absorbed. Exemplary drying times versus number of intercalated (interleaved) sheets is shown in Table 1. Further illustration is given in the Examples below.

TABLE 1

| Intercalated sheets per number of pages | Drying time (number of laminate sheet replacements) |
|---|---|
| 1 SAP sheet for every 30 pages | 12 hours with 6 changes of SAP sheets |
| 1 SAP sheet for every 20 pages | 5 hours with 4 changes of SAP sheets |
| 1 SAP sheet for every 10 pages | 1.5 hours with 3 changes of SAP sheets |
| 1 SAP sheet for every page | 10 minutes with no changes of SAP sheets |

In other embodiments, the laminate sheets can be used to form a desiccant bag into which an item, e.g., a wet book, is placed. The desiccant bag will draw moisture from all sides of the wet book. One advantage to this is in lowering the moisture content quickly. Saturated paper tends to stick together and tears easily, while damp paper is stronger and does not stick to itself. Such bags could optionally be used as a first press method, e.g., to draw up to 40%, 50%, etc., moisture from a book prior to final drying with intercalated laminates, etc. Similar bags can be constructed for addition of humidity to objects (e.g., the SAP layer would contain or be saturated with fluid to be released as humidity or vapor).

In addition to intercalating/interleaving the SAP laminates or placing them upon the material to be dried, in some embodiments, pressure can also be applied to the material. Such pressure helps in expelling moisture from the material and can also help in preventing or removing cockling and wrinkling of pages. Pressure can be applied in a similar fashion as is traditionally done in some forms of drying of books with blotting paper, e.g., with weights, with a book press, etc. Typically, the greater the force or pressure applied to the laminates against wet paper, the faster the wicking action occurs. However, as the moisture content approaches the normal moisture content (e.g., 7%) of a dry book it is more difficult to pull the last percentages of moisture from the book. Nonetheless, the constructs herein can dry a modern paperback in five hours when pressure is applied. The force required can be as little as a five-pound weight. Those of skill in the art will be familiar with such pressure methods and ways of determining proper pressure loads for material being dried.

In various embodiments, the SAP envelope can be left on or within the material to be dried or humidified for any desirable length of time, e.g., 10 minutes, 20 minutes, 30 minutes, 60 minutes, until the material is dry or sufficient humidity/moisture content is reached, until the SAP laminate cannot take up or give off any more moisture, until the laminate expands to a point requiring removal to prevent structural damage to the book, etc. A great advantage of the invention is that once moisture is taken up into the SAP, it will not leak back out. The fluid is safely trapped within the gel matrix. However, in various embodiments, such fluid saturated SAP can release vapor (not liquid), e.g., when the SAP is being dried or when it is being used as a humidicant.

As mentioned above, the present invention can also be used in conjunction with other means of drying and/or recovery techniques, e.g., heat, freezing, etc. Thus, in some usages, the SAP laminates of the invention can be used to dry material that is also being heated to help evaporate off moisture or can be used with freezing to help store materials and prevent mold damage until more thorough attention can be paid to the object. Wet books awaiting treatment can be placed in a container and frozen to avoid mold growth. Placing SAP laminates in the container can remove up to 50% of the moisture from the book while the item is stored, e.g., for two weeks, since passive moisture absorption occurs in freezers where SAP laminate devices of the invention are present. This, thus, lowers the labor cost and drying time when the book is finally processed.

Another beneficial aspect of the current invention is that the SAP constructs can optionally be reused multiple times. Depending upon the actual use, once the SAP laminates are saturated, they can be removed from the object (e.g., book) being dried and the laminate allowed to dry out. Since the SAP does not trap moisture, but rather holds it in suspension, it can be evaporated easily. The laminate sheets herein can be dried with little extra energy. Sunlight or slight airflow causes moisture to evaporate from the laminate within hours. Fan drying is also optionally used. However, the exterior surfaces of the laminate can sometimes trap dirt and become soiled after use. The actual number of times (e.g., 5 times, 6 times, 7 times, etc) that individual SAP laminates can be reused depends upon, e.g., the amount of dirt or other contaminants that the constructs accumulate during usage. Loss of absorbency can also result from salts clogging the SAP, thereby reducing effectiveness.

In drying a book or other object, etc., with multiple SAP laminate devices, the oldest (and typically dirtiest) devices can be used for initial water removal, thereby also taking up the largest amount of dirt/salt, etc. When the oldest/dirtiest device no longer absorbs effectively or becomes too soiled, it can optionally be discarded. Subsequent interleaving of laminate devices into the book can use ever cleaner and newer sheets to maximize absorption rates and keep the later used devices cleaner longer.

As moisture is taken into the laminated SAP system of the invention, and the gel is formed, the physical strength of the wet package, i.e., the laminated SAP device, is increased because the SAP gel becomes its own infrastructure, thus, allowing the moisture to be absorbed without tearing the outer laminate membranes. Hence, a SAP device having a large surface area will hold tens of times its own weight in moisture without fear of disintegrating. As an example a 12×18 inch sheet can hold a gallon of water, nearly nine pounds, without tearing. Once the water is absorbed into the system, no moisture is present at the surface in liquid form. The sheet becomes a humidity blanket, and gives off water vapor, but no liquid seeps, drips; or leaks out.

In typical books and other printed matter, the ink will not run when being dried with the invention. Printed books typically use an oil-based ink that is not water-soluble. A very strong solvent must be applied to ink to get it to run, and water does not supply the chemical reaction necessary for such to occur. Where there is manuscript material that has gotten wet and which has water-soluble ink, ink movement occurs upon the water initially hitting the ink. During the drying process ink typically will not run, however a spun fiber (e.g., Reemay, Reemay Inc., Old Hickory, Tenn.) can optionally be interleaved with the paper and the laminate herein to keep the ink from absorbing into the surface of the laminate.

In some embodiments herein, the methods and devices of the invention are used in conjunction with a full book immersion technique for quickly washing and deacidifying books and other papers. In such embodiments, the book is suspended in a fanned-out configuration, then slowly immersed into a bath, e.g., to help clean the book of dirt or other contaminants, and/or to aid in deacidification, etc. By immersing the book as a whole, countless hours involved in pulling apart and reconstructing the book are saved. Additionally, full book immersion keeps the book as an intact object and reduces the opportunity of destroying bibliographic evidence that pulling a book might endanger. After the book is immersed in its bath, it is dried through use of the methods and devices of the invention as detailed herein. Similar washing/deacidifying followed by drying with the present invention can also be applied to similar materials such as papers, artwork, etc.

Coupled with the drying aspects of the invention, such full-book immersion provides an advantageous route for cleaning and deacidifying books, even ones that have become inadvertently wet. Wet books need to be dried, but because they are already wet, dirt will move through the text-block. At times this dirt can cause "tide lines" that mar and obliterate the text itself. By immersing the bound book in a bath, dirt is washed off. If the book is acidic, it can then be deacidified in an aqueous bicarbonate solution (optionally at the same time) and rinsed clean, then dried quickly with the drying aspects of the invention. The opportunity to improve the chemical stability of acidic books while recovering them as a result of water damage presents a cost effective and timely solution that adds to current deacidification procedures.

In yet another embodiment, the methods and devices of the invention can be used to correct wrinkling, cockling, dog-earing, etc. of books and other papers. Old and/or heavily used books can often become wrinkled or dog-eared. Material that has become wet and dried improperly can become cockled. Such books can be wetted or humidified (optionally through full immersion as explained above) and then re-dried through use of the present invention.

In some instances, the SAP laminates of the invention can be used as poultices, or humidity blankets, e.g., for relaxing cockles, wrinkles, dog-ears, or brittle items. Smoothing out brittle material requires relaxing and flattening which can be a labor intensive process needing an even distribution of water vapor. In such cases, saturated SAP laminates can be placed on the wrinkled or cockled paper with less chance of damage to the paper than spraying or misting with water. In various embodiments, the SAP will be saturated with clean water, deionized water, water containing a fungicide, etc. While no direct liquid will come off of the SAP laminate, it will provide a high humidity micro-environment allowing slight dampening of the pages, which can then optionally be re-dried with the methods/devices of the current invention to remove the wrinkling/cockling.

In addition to the uses explained throughout, the constructs and liquid/moisture manipulation methods herein can be used in myriad situations in addition to drying of books/papers. For example, the devices and methods herein can be used for moisture control in flooded or fire-damaged structures as desiccants for walls, carpets, and floors to soak up water and/or pull moisture out of the air as a passive dehumidifier. The invention can also optionally be used in transportation applications in chambers, vaults, storage containers and cargo holds to reduce or increase relative humidity with minimal energy and labor costs. Additionally, transport/storage of firearms and steel parts in envelopes constructed from the laminated SAP packages herein can help in amelioration of rust. Such envelopes/packages can also be used for storage/moisture control of clothing, gear, and equipment such as shoes, ski boots, and other such equipment. The invention is also amenable to incorporation into product packaging to control moisture levels for, e.g., electronics, perishable goods such as foodstuffs, dehydration and freeze-drying of food, feed and grain processing, leather, lumber, paper, biological specimen collection and preservation, computer chips, firearms, delicate instruments, and other materials susceptible to moisture etc. Also, in general, SAP laminate envelopes can be used to dry, humidify, maintain, and/or restore accessories such as wood, tapestries, rugs, clothing, shoes, and other textiles, baskets, and items composed of animal, plant and/or cellulose materials.

As illustrated above, it will be appreciated that the invention can also be used to create a moist environment as well as to reduce moisture in an environment. Thus, for items that need a particular level of humidity (e.g., artwork, furniture, musical instruments, archival material, etc.), the current invention can also be used, when the SAP is saturated with water, to add and/or retain moisture in a system. Thus, the current invention is also optionally used a way to humidify an object (e.g., to increase the object's moisture content to a desired level and/or to increase the moisture content of an object's environment to desired level). The SAP laminates herein can also be used as poultices to deliver a slow even source of moisture or solvent to an entire object or to a specific location on an object.

The present invention satisfies many different objects in the public interest by providing a drying system for damp and wet books and other library materials that have been damaged during natural and man-made disasters. For example, in embodiments comprising a cornstarch based SAP (e.g., Super Slurper), the invention develops a value-added, non-food product from corn. The invention provides a new use for the cornstarch polymer product, while providing a product and a delivery system that are environmentally friendly. The invention increases methods for recovery of water-damaged books and other library and archival materials and provides for onsite drying not only for convenience and control but also for protection of personal records and classified materials. The invention also improves chemical stability of collections at time of water damage by supplying an opportunity for reducing acidic nature of the damaged book materials.

EXAMPLES

Example 1

Comparison of Newsprint and SAP Laminate Sheets in Book Drying

A comparison was made between drying a book by blotting with newsprint and drying through use of the present invention. Traditional drying with newsprint involves the interleaving of clean newsprint between pages of a book (e.g., every 10 pages, etc.). Certain embodiments of the present invention utilize interleaving of SAP laminate sheets of the invention between pages of a book (e.g., every 10 pages, etc.). Because the present invention works well on any porous material, factors such as age of the book, paper manufacture, types of ink or binding style do not typically influence drying efficiency. As can be seem from Table 2, when the SAP laminate sheets of the invention were compared against blotting with newsprint, the SAP sheets dried the book in 1.5 hours, while the newsprint required a full 2.5 days. No mold growth was observed in either sample, but in actual disaster or recovery environments, mold growth can start within 48 hours (well within the 2.5 days it took to dry the book using newsprint). In general, increasing frequency of interleavings of the SAP laminates, increases the speed of drying. Because paper takes on, and gives off, water through capillary action, placement of more SAP sheets within the text-block of a book increases absorption since the moisture will not have to wick as far through the wet paper to encounter an SAP sheet. Those of skill in the art will be familiar with numerous means to determine/measure moisture content of books/papers. For example, weighting the materials before and after moisture is applied and/or removed, use of a water moisture meter (e.g., those specifically designed for such use such Gardco Water Moisture Meters (Gardco, Pompano Beach, Fla.).

TABLE 2

Dri-Gel -vs.- Newsprint: Each 150 pg. book immersed in water one hour. Interleave every five leaves (10 pages), press for 15 minutes, check with moisture meter in three locations within textblock and weigh with scale.

|  | DG - FRONT | NP - BACK |
| --- | --- | --- |
| Book dry weight | 4.0 oz | 4.0 oz |
| Moisture meter readings, dry | 14.6, 15.3, 12.2 | 14.6, 14.9, 14.4 |
| Number of pages |  |  |
| Book wet weight | 11.2 oz | 11.1 oz |
| Weight of water in book | 7.2 oz | 7.1 oz |
| Percentage of water relative to dry weight | 180% | 177% |
| 15 MIN PRESS INTERVAL |  |  |
| Book weight | 6.3 oz | 9.3 oz |
| Amount of water removed | 4.9 oz | 1.8 oz |
| Remaining water weight | 2.3 oz | 5.3 oz |
| Percentage of water relative to dry weight | 57% | 132% |
| Moisture meter readings | off the chart | off the chart |
| 15 MIN PRESS INTERVAL |  |  |
| Book weight | 5.0 oz | 8.6 oz |
| Amount of water removed | 1.3 oz | 0.7 oz |
| Remaining water weight | 1.0 oz | 4.6 oz |
| Percentage of water relative to dry weight | 25% | 115% |
| Moisture meter readings | 15, 15.2, 14.8 | off the chart |
| 15 MIN PRESS INTERVAL |  |  |
| Book weight | 4.22 oz Book is dry at this point |  |
| Amount of water removed | 0.78 oz |  |
| Remaining water weight | 0.22 oz |  |
| Percentage of water relative to dry weight | 5% |  |
| Moisture meter readings | 15.0, 14.8, 14.2 |  |
| 15 MIN PRESS) INTERVAL |  |  |
| Book weight |  | 8.1 oz |
| Amount of water removed |  | 0.5 oz |
| Remaining water weight |  | 4.1 oz |
| Percentage of water relative to dry weight |  | 102% |
| Moisture meter readings |  | off the chart |
| 15 MIN PRESS INTERVAL |  |  |
| Book weight |  | 7.1 |
| Amount of water removed |  | 1.0 oz |
| Remaining water weight |  | 3.1 oz |
| Percentage of water relative to dry weight |  | 77% |
| Moisture meter readings |  | off the chart |
| 15 MIN PRESS INTERVAL |  |  |
| Book weight |  | 6.3 |
| Amount of water removed |  | 0.8 oz |
| Remaining water weight |  | 2.3 oz |
| Percentage of water relative to dry weight |  | 57% |
| Moisture meter readings |  | off the chart |

Example 2

Use of SAP Laminate Sheets to Relax Brittle Papers

Figure 2B:

SAP laminate sheets of the invention were used to relax "dog-ears" of book pages. SAP laminate sheets were wetted and placed under a manuscript page to allow water vapor from the laminate sheet to moisten and relax the page. In this example, once the page had become relaxed from the humidity, silicon release paper was placed on either side of the page and the dog-ear was pressed out with a tacking iron at medium-low heat. Once the crease was relaxed, heat was again applied, with more blotter underneath the area, to drive out remaining moisture. Of course, instead of pressing out the creases with a tacking iron, additional sheets of dry SAP laminate could have been applied, optionally with pressure, to remove the applied moisture. As work progressed through the book, previously relaxed pages were subjected to subsequent pressure and heat from work on the pages above them thereby aiding in the removal of the dog-ears. The vellum covers of the book wrapper were also subjected to the same procedure with the SAP laminates, with similar results. FIG. 2, Panels A and B show before and after depictions of the text subjected to the above procedure.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above can be used in various combinations. All publications, patents, patent applications, or other documents cited in this application are incorporated by reference in their entirety for all purposes to the same extent as if each individual publication, patent, patent application, or other document were individually indicated to be incorporated by reference for all purposes.

What is claimed is:

1. A method of manipulating the moisture content of one or more object, the method comprising, bringing one or more laminate construct into contact with the object for a defined period of time, wherein the laminate compnses a superabsorbent polymer (SAP) layer sealed within at least one layer of porous material;

further wherein the object comprises a paper product, a book, paper, vellum, parchment, or a fiber-based object and wherein the laminate comprises a sheet of laminate which is intercalated between pages of the book, or pieces of the paper, vellum, parchment, or fiber-based object.

2. The method of claim 1, wherein the layer of SAP comprises a water soluble adhesive, methylcellulose, starch, wheatstarch, or cornstarch; wherein the layer of SAP comprises powdered, granulated, or particulated SAP; andlor wherein the layer of SAP does not comprise additional mechanical structural elements.

3. The method of claim 1, wherein the layer of SAP does not substantially impregnate or penetrate into the layers of porous material.

4. The method of claim 1, wherein SAP is chosen from the group consisting of a polyacrylamide, a polyacrylamide derivative, a polyacrylonitrile, a polyacrylonitrile derivative, a starch, a starch based SAP, an alkali saponified gelatinized-starch-polyacrylonitrile graft polymer and Super Slurper, wherein Super Slurper comprises a superabsorbent polymer comprising a water-insoluble alkali salt of aqueous alkali saponified gelatinized-starch-polyacrylonitrile graft polymers which contain gelatinized starch (GS) and saponified polyacrylonitrile (HPAN) in molar ratios of from about 1:1.5 to 1:9 GS:HPAN.

5. The method of claim 1, wherein the porous material comprises one or more of: paper, filter paper, nylon membrane, cloth, or nonwoven membrane.

6. The method of claim 1, wherein contact comprises the object being in close proximity with the laminate; wherein contact comprises the object touching the laminate; or wherein contact comprises the object touching the laminate, wherein the contact is done under pressure.

7. The method of claim 1, wherein manipulating the moisture content comprises decreasing the moisture content of the one or more object or wherein manipulating the moisture content comprises increasing the moisture content of the one or more object.

8. The method of claim 7, wherein the SAP comprises one or more fluid.

9. The method of claim 8, wherein the fluid is capable of evaporation; wherein the fluid is at least partially aqueous based; and/or wherein the SAP is saturated with the fluid.

10. A method of producing one or more laminate device for manipulating moisture content of one or more object or area, the method comprising:

depositing a slurry comprising water and SAP or a slurry comprising water, SAP and one or more water soluble adhesive on a first membrane of porous material; or, depositing a first layer comprising a slurry of water and SAP or comprising a slurry of water and a water soluble adhesive or comprising a slurry of water, SAP and a water soluble adhesive and, depositing a second layer comprising dry SAP, or a slurry of SAP and water or a slurry of SAP, water, and a water soluble adhesive on the first layer;

placing a second membrane on the slurry or slurries on the first membrane; and, sealing the first and second membranes together, thereby constructing the laminate device.

11. The method of claim 10, wherein the one or more water-soluble adhesive comprises one or more of: methylcellulose, starch, wheatstarch, or cornstarch.

12. The method of claim 10, wherein SAP is chosen from the group consisting of a polyacrylamide, a polyacrylamide derivative, a polyacrylonitrile, a polyacrylonitrile derivative, a starch, a starch based SAP, an alkali saponified gelatinized-starch-polyacrylonitrile graft polymer, and, Super Slurper, wherein Super Slurper comprises a superabsorbent polymer comprising a water-insoluble alkali salt of aqueous alkali saponified gelatinized-starch-polyacrylonitrile graft polymers which contain gelatinized starch (GS) and saponified polyacrylonitrile (HPAN) in molar ratios of from about 1:1.5 to 1:9 GS:HPAN.

13. The method of claim 10, wherein the porous material comprises one or more of: paper, filter paper, nylon membrane, cloth, or nonwoven membrane.

14. The method of claim 10, wherein the second membrane comprises one or more layer of SAP and/or SAP and a water soluble adhesive.

15. A method of increasing the moisture content of one or more object or area, the method comprising, bringing one or more laminate construct into contact with the object or area for a defined period of time, wherein the laminate compnses a superabsorbent polymer (SAP) layer sealed within at least one layer of porous material and wherein the SAP comprises one or more fluid capable of evaporation, which evaporation thereby increases the moisture content of the one or more object or area;

further wherein the object comprises a paper product, a book, paper, vellum, parchment, or a fiber-based object and wherein the laminate comprises a sheet of laminate which is intercalated between pages of the book, or pieces of the paper, vellum, parchment, or fiber-based object.

* * * * *

UNITED STATES PATENT AND TRADEMARK OFFICE
CERTIFICATE OF CORRECTION

PATENT NO. : 7,591,881 B2 Page 1 of 1
APPLICATION NO. : 11/241746
DATED : September 22, 2009
INVENTOR(S) : Yeager et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 336 days.

Signed and Sealed this

Fourteenth Day of December, 2010

David J. Kappos
*Director of the United States Patent and Trademark Office*